United States Patent
Young et al.

(10) Patent No.: US 10,975,897 B2
(45) Date of Patent: Apr. 13, 2021

(54) HYDRAULIC OIL TEMPERATURE MANAGEMENT

(71) Applicant: Clark Equipment Company, West Fargo, ND (US)

(72) Inventors: Charles Young, Bismarck, ND (US); Brandon Kisse, Bismarck, ND (US)

(73) Assignee: CLARK EQUIPMENT COMPANY, West Fargo, ND (US)

( * ) Notice: Subject to any disclaimer, the term of this patent is extended or adjusted under 35 U.S.C. 154(b) by 0 days.

(21) Appl. No.: 16/522,360

(22) Filed: Jul. 25, 2019

(65) Prior Publication Data

US 2020/0032821 A1 Jan. 30, 2020

Related U.S. Application Data

(60) Provisional application No. 62/703,130, filed on Jul. 25, 2018.

(51) Int. Cl.
F15B 21/045 (2019.01)
F15B 21/02 (2006.01)
F15B 11/10 (2006.01)

(52) U.S. Cl.
CPC .......... F15B 21/045 (2013.01); F15B 11/10 (2013.01); F15B 21/02 (2013.01)

(58) Field of Classification Search
CPC  F15B 21/042; F15B 21/0423; F15B 21/0427; F15B 21/045; F15B 2211/66; F15B 2211/6651
See application file for complete search history.

(56) References Cited

U.S. PATENT DOCUMENTS

| | | | | |
|---|---|---|---|---|
| 5,100,082 A | * | 3/1992 | Archung | B64D 41/00 244/76 R |
| 5,251,440 A | * | 10/1993 | Bong-dong | E02F 9/226 60/329 |
| 5,352,095 A | * | 10/1994 | Tanaka | E02F 9/2246 417/12 |
| 5,628,229 A | * | 5/1997 | Krone | F04B 49/065 702/130 |
| 5,941,689 A | | 8/1999 | Skirde | |
| 5,951,258 A | | 9/1999 | Lueschow et al. | |
| 6,195,989 B1 | | 3/2001 | Hall et al. | |
| 6,966,180 B2 | | 11/2005 | Deneir et al. | |
| 7,020,553 B2 | | 3/2006 | Nakamura et al. | |

(Continued)

FOREIGN PATENT DOCUMENTS

EP 1260716 A1 11/2002
JP 2008057468 A 3/2008

OTHER PUBLICATIONS

International Search Report and Written Opinion dated Oct. 16, 2019 for International Application No. PCT/US2019/043467 filed Jul. 25, 2019, 16 pages.

*Primary Examiner* — Abiy Teka
*Assistant Examiner* — Matthew Wiblin
(74) *Attorney, Agent, or Firm* — John Veldhuis-Kroeze; Westman, Champlin & Koehler, P.A.

(57) ABSTRACT

Disclosed embodiments include power machines, and hydraulic systems for power machines, in which a machine controller is configured to detect high temperature conditions of the hydraulic oil and to responsively control or reduce the overall torque available from the engine to reduce heat generation in the hydraulic system.

19 Claims, 6 Drawing Sheets

(56) References Cited

U.S. PATENT DOCUMENTS

| | | | |
|---|---|---|---|
| 7,481,053 B2* | 1/2009 | Kitano | B60K 6/48 |
| | | | 60/329 |
| 8,051,649 B2 | 11/2011 | Yoshimoto et al. | |
| 8,056,331 B2* | 11/2011 | Kakizawa | E02F 9/2285 |
| | | | 60/431 |
| 8,171,895 B2 | 5/2012 | Scolton et al. | |
| 8,317,655 B2 | 11/2012 | Sakamoto | |
| 8,424,298 B2* | 4/2013 | Ariga | E02F 9/2282 |
| | | | 60/329 |
| 8,668,042 B2 | 3/2014 | Elliott | |
| 8,726,664 B2 | 5/2014 | Narazaki et al. | |
| 9,103,096 B2 | 8/2015 | Kondo | |
| 9,617,937 B2 | 4/2017 | Baroni et al. | |
| 2004/0141849 A1* | 7/2004 | Deneir | F15B 21/045 |
| | | | 417/32 |
| 2008/0108032 A1* | 5/2008 | Tuhy | E02F 9/2292 |
| | | | 434/245 |
| 2010/0050621 A1* | 3/2010 | Beschorner | F04B 49/02 |
| | | | 60/329 |
| 2012/0144817 A1 | 6/2012 | Kondo | |
| 2013/0099931 A1* | 4/2013 | Wetherill | F04B 49/10 |
| | | | 340/606 |
| 2013/0226415 A1 | 8/2013 | Smith et al. | |
| 2014/0039768 A1 | 2/2014 | Sawada et al. | |
| 2015/0308469 A1 | 10/2015 | Beschorner et al. | |
| 2015/0354609 A1* | 12/2015 | Dauderman | F16H 57/0408 |
| | | | 60/453 |
| 2016/0003265 A1 | 1/2016 | Joung et al. | |
| 2016/0230785 A1* | 8/2016 | Boisvert | H02P 9/04 |

\* cited by examiner

HYDRAULIC OIL TEMPERATURE MANAGEMENT

CROSS-REFERENCE TO RELATED APPLICATION

This application claims the benefit of U.S. Provisional Application No. 62/703,130, which was filed on Jul. 25, 2018.

BACKGROUND

The present disclosure is directed toward power machines. More particularly, the present disclosure is directed toward hydraulic systems of power machines such as loaders.

Power machines, for the purposes of this disclosure, include any type of machine that generates power for the purpose of accomplishing a particular task or a variety of tasks. One type of power machine is a work vehicle. Work vehicles, such as loaders, are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Power machines typically include a frame, at least one work element, and a power source that is capable of providing power to the work element to accomplish a work task. One type of power machine is a self-propelled work vehicle. Self-propelled work vehicles are a class of power machines that include a frame, work element, and a power source that is capable of providing power to the work element. At least one of the work elements is a drive or motive system for moving the power machine under power. Typically, another work element is an implement system, including the implement which performs a work function and lift arms or other elements which move the implement to work positions. The power source for providing power to the work elements of a power machine typically include hydraulic systems. Under high operating loads, hydraulic oil temperature can rise to levels that are potentially damaging to components.

The discussion above is merely provided for general background information and is not intended to be used as an aid in determining the scope of the claimed subject matter.

SUMMARY

This Summary and the Abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

Disclosed embodiments include power machines, and hydraulic systems for power machines, in which a controller is configured to detect high temperature conditions of the hydraulic oil and to responsively control or reduce the overall torque available from the engine. This reduces overall heat generation in the hydraulic system. In some exemplary embodiments, multiple temperature sensors are used to detect hydraulic oil temperatures in different portions of the hydraulic system in order to identify temperature variations due to load case. For example, in some embodiments, temperature sensors are positioned to determine whether hydraulic system loading and heating of the hydraulic oil is occurring because of use of the drive system or use of the implement system. Identifying the load case provides improved control of cooling, and allows the engine to be controlled such that the oil temperature in certain circumstances is allowed to remain higher than in other circumstances.

Disclosed embodiments include power machines, such as loaders, and methods of managing hydraulic oil system temperature. A system of one or more controllers or computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a power machine (100; 200; 300) including: an engine (305) configured to provide a variable output torque; a hydraulic system, powered by the engine, and a machine controller (340). The hydraulic system includes a power conversion system including a first hydraulic pump (310) coupled to and driven by the engine to provide pressurized hydraulic oil at one or more outlets; a drive system (320) coupled to and configured to receive pressurized hydraulic oil from the power conversion system; an implement system (325) coupled to and configured to receive pressurized hydraulic oil from the power conversion system; a first temperature sensor (330) positioned and configured to measure a first temperature of hydraulic oil in the drive system and to provide a first temperature signal (332) indicative of the measured first temperature of the hydraulic oil in the drive system; and a second temperature sensor (335) positioned and configured to measure a second temperature of hydraulic oil and to provide a second temperature signal (337) indicative of the measured second temperature and an effect that the implement system has on the hydraulic oil. The machine controller (340) is coupled to the first and second temperature sensors to receive the first temperature signal and the second temperature signal, the machine controller configured to control the variable output torque of the engine based upon the first and second temperature signals to allow different engine torques for hydraulic oil temperatures in different ranges.

Implementations may include one or more of the following features. The power machine and further comprising an engine controller (345) coupled to the machine controller (340) and to the engine, the machine controller configured to provide a signal to the engine controller to control the variable output torque of the engine.

The power machine where the drive system (320) includes a first drive motor (226A). The power machine where the first temperature sensor (330) is positioned to measure temperature of hydraulic oil at one of an inlet (402) and an outlet (404) of the first drive motor (226A).

The power machine where the first drive motor has a case drain outlet (406) with a return line (408) provided from the case drain to a hydraulic reservoir (410), and wherein the first temperature sensor is positioned to measure temperature of hydraulic oil in the return line (408) between the case drain outlet of the first drive motor and the hydraulic reservoir.

The power machine where the drive system includes a second drive motor (426B) with a case drain outlet (416), wherein a return line (418) from the case drain outlet of the second drive motor is in communication with the return line (408) from the case drain outlet of the first drive motor, and wherein the return lines from the two case drain outlets are merged together and wherein the first temperature sensor (330) is positioned to measure temperature in the merged return lines.

The power machine where the second temperature sensor (335) is positioned to measure temperature of hydraulic oil at a case drain (502) of the at least one hydraulic pump (224C).

The power machine and further comprising a frame (110; 210) and a lift arm assembly (230) pivotally coupled to the frame, the implement system (325) further comprising at least one lift actuator (238) coupled between the lift arm assembly and the frame and configured to receive pressurized hydraulic oil from the power conversion system to raise and lower the lift arm assembly.

The power machine where the implement system (325) includes a control valve (515) configured to receive hydraulic oil from the power conversion system and selectively provide hydraulic flow to the lift actuator.

The power machine where the implement system further comprises an implement carrier (272) pivotally coupled to the lift arm assembly, the implement system further comprising at least one implement carrier actuator (235) coupled between the lift arm assembly and the implement carrier and configured to receive selectively pressurized hydraulic oil from the power conversion system through the control valve to rotate the implement carrier relative to the lift arm assembly.

The power machine where the implement system further includes auxiliary function actuators (520).

The power machine where the machine controller (340) is configured to reduce output torque of the engine when one of the first and second temperature sensors indicates a temperature that exceeds one of multiple predetermined threshold temperatures to reduce heat generation in a hydraulic system.

The power machine where the machine controller (340) is configured such that, upon one of the first and second temperature sensors indicating a temperature that exceeds one of the multiple threshold temperatures, the machine controller allows higher output torque of the engine when the first temperature is higher than the second temperature indicating higher oil temperatures in the drive system as compared to the implement system, and the machine controller lowers output torque of the engine further when the second temperature is higher than the first temperature indicating higher oil temperatures in the implement system as compared to the drive system.

The power machine where the machine controller (340) is configured such that, upon one of the first and second temperature sensors indicating a temperature that exceeds one of the multiple threshold temperatures, the machine controller allows higher output torque of the engine when the second temperature is higher than the first temperature indicating higher oil temperatures in the implement system as compared to the drive system, and the machine controller lowers output torque of the engine further when the first temperature is higher than the second temperature indicating higher oil temperatures in the drive system as compared to the implement system.

One general aspect includes a control system for a power machine (100; 200; 300) having an engine (305) configured to provide a variable output torque and a hydraulic system coupled to and driven by the engine to provide pressurized hydraulic oil at one or more outlets, a drive system (320) configured to selectively receive pressurized hydraulic oil to cause the power machine to move over a support surface, and an implement system (325) configured to selectively receive pressurized hydraulic oil to control one or more implement functions on the power machine. The control system includes: a first temperature sensor (330) positioned and configured to measure a first temperature of hydraulic oil in the drive system and to provide a first temperature signal (332) indicative of the measured first temperature of the hydraulic oil in the drive system; a second temperature sensor (335) positioned and configured to measure a second temperature of hydraulic oil and to provide a second temperature signal (337) indicative of the measured second temperature and an effect that the implement system has on the hydraulic oil; and a machine controller (340) coupled to the first and second temperature sensors to receive the first temperature signal and the second temperature signal, the machine controller configured to manage the variable output torque of the engine based upon the first and second temperature signals to allow different engine torques for hydraulic oil temperatures in different ranges.

Implementations may include one or more of the following features. The control system where the machine controller (340) is configured to manage the variable output torque of the engine to allow different engine torques for hydraulic oil temperatures in different ranges such that the machine controller allows higher output torque of the engine when the first temperature is higher than the second temperature indicating higher oil temperatures in the drive system as compared to the implement system, and the machine controller lowers output torque of the engine comparatively further when the second temperature is higher than the first temperature indicating higher oil temperatures in the implement system as compared to the drive system.

The control system where wherein the machine controller is configured to reduce output torque of the engine when one of the first and second temperatures exceeds one of multiple predetermined threshold temperatures to reduce heat generation in a hydraulic system including the at least one hydraulic pump (310), the drive system (320) and the implement system.

The control system where the machine controller is configured to reduce output torque of the engine further as one of the first and second temperatures exceeds higher ones of the multiple predetermined threshold temperatures.

The control system where the machine controller is configured to manage the variable output torque of the engine by signaling to an engine controller (345) to control the variable output torque of the engine.

DESCRIPTION

The concepts disclosed in this discussion are described and illustrated by referring to illustrative embodiments. These concepts, however, are not limited in their application to the details of construction and the arrangement of components in the illustrative embodiments and are capable of being practiced or being carried out in various other ways. The terminology in this document is used to describe illustrative embodiments and should not be regarded as limiting. Words such as "including," "comprising," and "having" and variations thereof as used herein are meant to encompass the items listed thereafter, equivalents thereof, as well as additional items.

Disclosed embodiments are directed to power machines having hydraulic systems which direct hydraulic power to systems such as implement systems (lift arm and auxiliary functions) and drive systems. In exemplary embodiments, a controller is configured to detect high temperature conditions of the hydraulic oil and to responsively reduce the overall torque available from the engine to thereby reduce overall heat generation in the hydraulic system. In some exemplary embodiments, multiple temperature sensors are used to detect hydraulic oil temperatures in different portions of the hydraulic system and to detect temperature variations based upon load case. For example, in some embodiments, temperature sensors are positioned to determine whether hydraulic system loading and heating of the hydraulic oil is occurring from use of the drive system or use of the implement system. Identifying the load case provides improved control of cooling, and allows the engine to be controlled such that the oil temperature in certain circumstances is allowed to remain higher.

Figure 2:
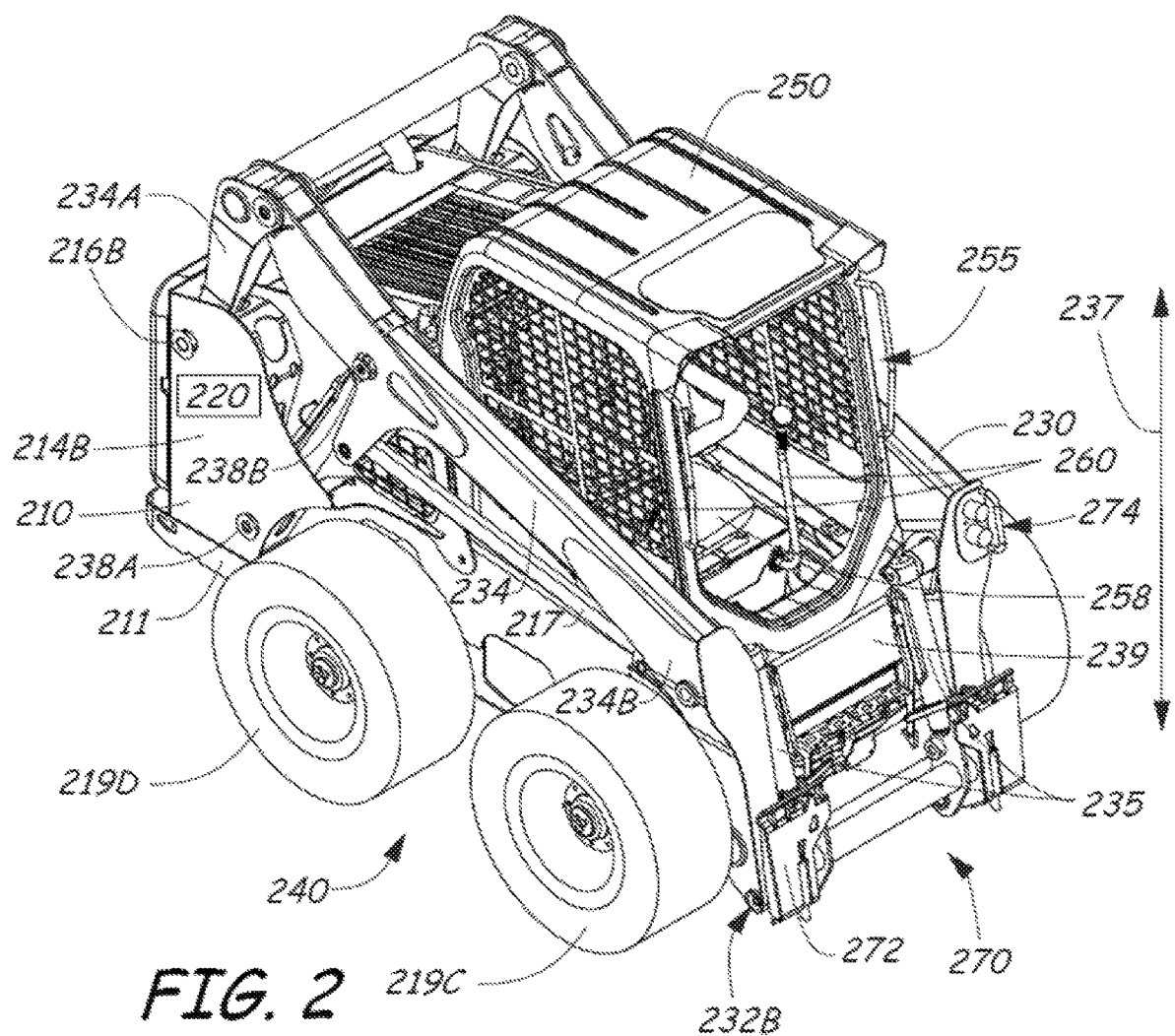
FIG. 2 is a front perspective view of a power machine on which embodiments disclosed herein can be advantageously practiced.
Figure 3:
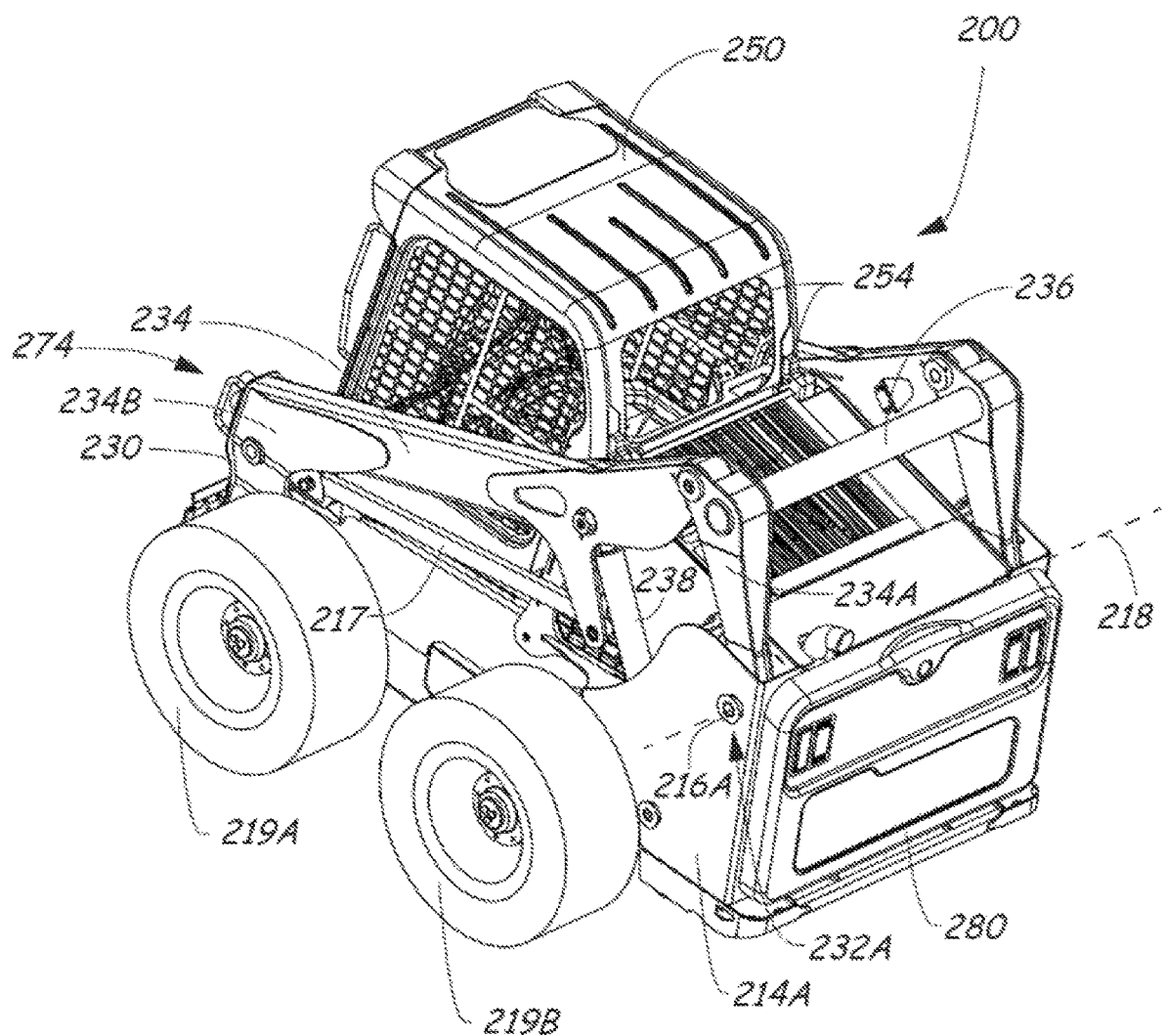
FIG. 3 is a rear perspective view of the power machine shown in FIG. 2.

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine (i.e., a skid-steer loader) is illustrated and discussed as being a representative power machine. However, as mentioned above, the embodiments below can be practiced on various types of power machines, including power machines of different types from the representative power machine shown in FIGS. 2-3.

Power machines, for the purposes of this discussion, include a frame, at least one work element, and a power source that is capable of providing power to the work element to accomplish a work task. One type of power machine is a self-propelled work vehicle. Self-propelled work vehicles are a class of power machines that include a frame, work element, and a power source that is capable of providing power to the work element. At least one of the work elements is a motive system for moving the power machine under power.

Figure 1:
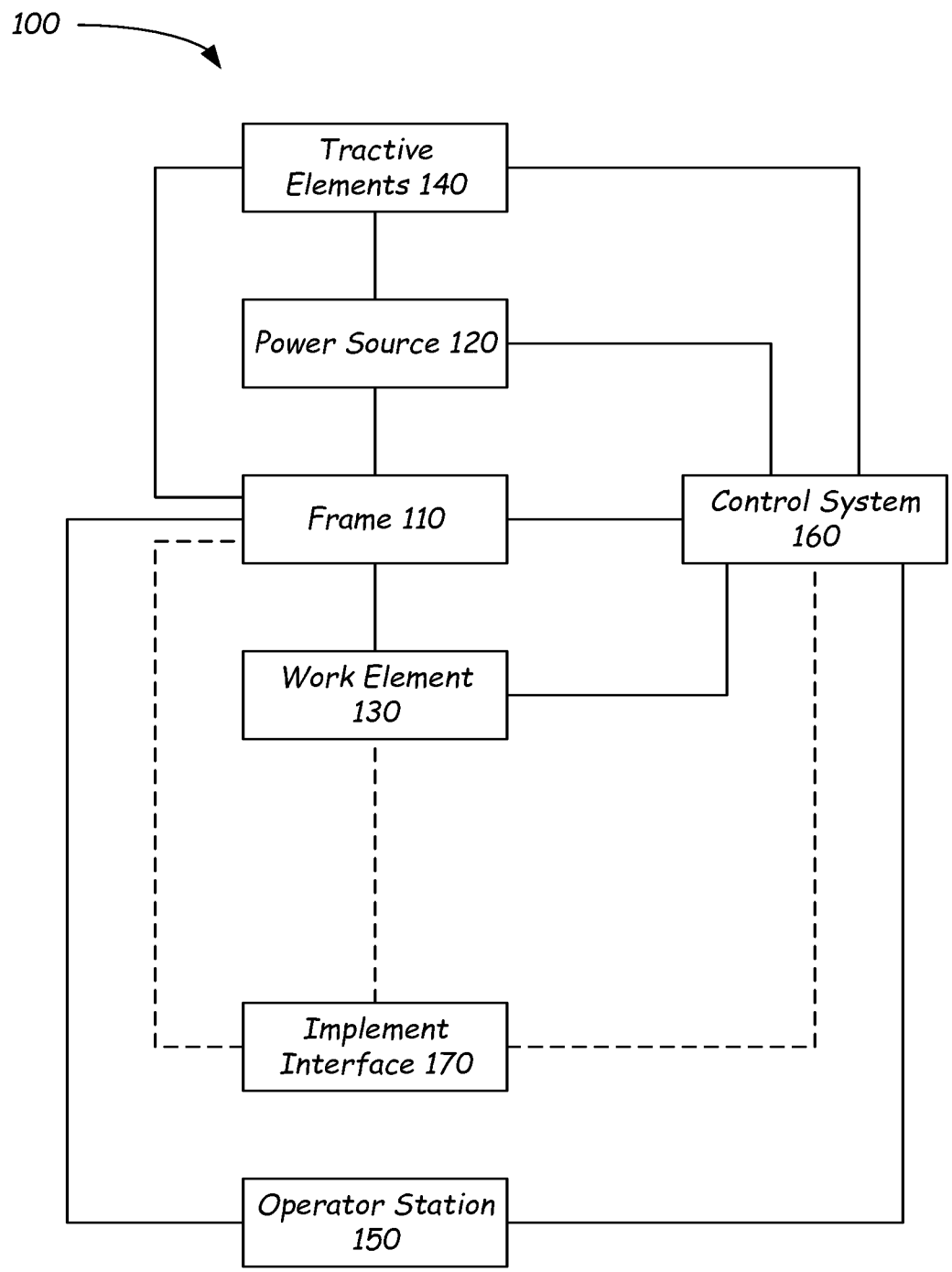
FIG. 1 is a block diagram illustrating functional systems of a representative power machine on which embodiments of the present disclosure can be advantageously practiced.

FIG. 1 shows a block diagram illustrating the basic systems of a power machine 100 upon which the embodiments discussed below can be advantageously incorporated and can be any of a number of different types of power machines. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that are capable of performing a dedicated task. For example, some work vehicles have a lift arm to which an implement such as a bucket is attached such as by a pinning arrangement. The work element, i.e., the lift arm can be manipulated to position the implement for the purpose of performing the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that is capable of moving with respect to another portion of the frame. For example, excavators can have an upper frame portion that rotates with respect to a lower frame portion. Other work vehicles have articulated frames such that one portion of the frame pivots with respect to another portion (so-called articulated frames) for accomplishing steering functions.

Frame 110 supports the power source 120, which is capable of providing power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is capable of converting the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 has an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, even if they have operator compartments or operator positions, may be capable of being operated remotely (i.e. from a remotely located operator station) instead of or in addition to an operator station adjacent or on the power machine. This can include applications where at least some of the operator-controlled functions of the power machine can be operated from an operating position associated with an implement that is coupled to the power machine. Alternatively, with some power machines, a remote-control device can be provided (i.e. remote from both the power machine and any implement to which is it coupled) that is capable of controlling at least some of the operator-controlled functions on the power machine.

FIGS. 2-3 illustrates a loader 200, which is one example of the power illustrated in FIG. 1 where the embodiments discussed below can be advantageously employed. Loader 200 is a skid-steer loader, which is a loader that has tractive elements (in this case, four wheels) that are mounted to the frame of the loader via rigid axles. Here the phrase "rigid axles" refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements.

The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220 that can generate or otherwise providing power for operating various functions on the power machine. Power system 220 is shown in block diagram form but is located within the frame 210. Frame 210 also supports a work element in the form of a lift arm assembly 230 that is powered by the power system 220 for performing various work tasks. As loader 200 is a work vehicle, frame 210 also supports a traction system 240, powered by power system 220, for propelling the power machine over a support surface. The power system 220 is accessible from the rear of the machine. A tailgate 280 covers an opening (not shown) that allows access to the power system 220 when the tailgate is an opened position. The lift arm assembly 230 in turn supports an implement interface 270 that provides attachment structures for coupling implements to the lift arm assembly.

The loader 200 includes a cab 250 that defines an operator station 255 from which an operator can manipulate various control devices 260 to cause the power machine to perform various work functions. Cab 250 can be pivoted back about an axis that extends through mounts 254 to provide access to power system components as needed for maintenance and repair. The operator station 255 includes an operator seat 258 and a plurality of operation input devices, including control levers 260 that an operator can manipulate to control various machine functions. Operator input devices can include buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 100 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that include and/or interact with the embodiments discussed below can have various frame components that support various work elements. The elements of frame 210 discussed herein are provided for illustrative purposes and frame 210 is not the only type of frame that a power machine on which the embodiments can be practiced can employ. The elements of frame 210 discussed herein are provided for illustrative purposes and is not necessarily the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200 is attached to the undercarriage 211 such as with fasteners or by welding the undercarriage to the mainframe. Mainframe 212 includes a pair of upright portions 214A and 214B located on either side and toward the rear of the mainframe that support lift arm structure 230 and to which the lift arm structure 230 is pivotally attached. The lift arm structure 230 is illustratively pinned to each of the upright portions 214A and 214B. The combination of mounting features on the upright portions 214A and 214B and the lift arm structure 230 and mounting hardware (including pins used to pin the lift arm structure to the mainframe 212) are collectively referred to as joints 216A and 216B (one is located on each of the upright portions 214) for the purposes of this discussion. Joints 216A and 216B are aligned along an axis 218 so that the lift arm structure is capable of pivoting, as discussed below, with respect to the frame 210 about axis 218. Other power machines may not include upright portions on either side of the frame or may not have a lift arm structure that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports tractive elements in the form of wheels 219A-D (collectively, 219) on either side of the loader 200.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is what is known as a vertical lift arm, meaning that the lift arm assembly 230 is moveable (i.e. the lift arm assembly can be raised and lowered) under control of the loader 200 with respect to the frame 210 along a lift path 237 that forms a generally vertical path, although the path may not actually be exactly vertical. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e. along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

An implement interface 270 is located proximal to a second end 232B of the lift arm assembly 234. The implement interface 270 includes an implement carrier 272 that is capable of accepting and securing a variety of different implements to the lift arm 230. Such implements have a complementary machine interface that is configured to be engaged with the implement carrier 272. The implement carrier 272 is pivotally mounted at the second end 232B of the arm 234. Implement carrier actuators 235 are operably coupled the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the excavator 200 to allow communication between a controller on an implement and electronic devices on the loader 200.

Figure 4:
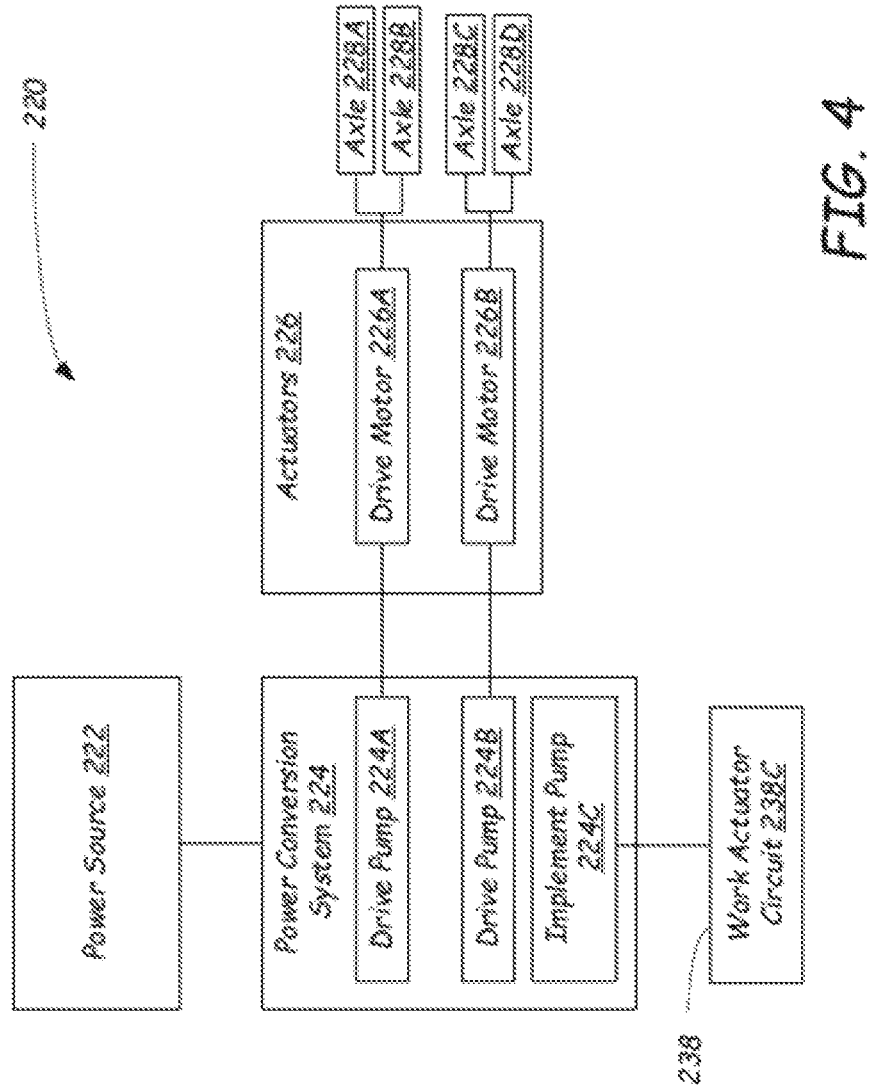
FIG. 4 is a block diagram illustrating components of a power system of a loader such as the loader illustrated in FIGS. 2-3.

Frame 210 supports and generally encloses the power system 220 so that the various components of the power system 220 are not visible in FIGS. 2-3. FIG. 4 includes, among other things, a diagram of various components of the power system 220. Power system 220 includes one or more power sources 222 that are capable of generating and/or storing power for use on various machine functions. On power machine 200, the power system 220 includes an internal combustion engine. Other power machines can include electric generators, rechargeable batteries, various other power sources or any combination of power sources that are capable of providing power for given power machine components. The power system 220 also includes a power conversion system 224, which is operably coupled to the power source 222. Power conversion system 224 is, in turn, coupled to one or more actuators 226, which are capable of performing a function on the power machine. Power conversion systems in various power machines can include various components, including mechanical transmissions, hydraulic systems, and the like. The power conversion system 224 of power machine 200 includes a pair of hydrostatic drive pumps 224A and 224B, which are selectively controllable to provide a power signal to drive motors 226A and 226B. The drive motors 226A and 226B in turn are each operably coupled to axles, with drive motor 226A being coupled to axles 228A and 228B and drive motor 226B being coupled to axles 228C and 228D. The axles 228A-D are in turn coupled to tractive elements 219A-D, respectively. The drive pumps 224A and 224B can be mechanically, hydraulic, and/or electrically coupled to operator input devices to receive actuation signals for controlling the drive pumps.

The arrangement of drive pumps, motors, and axles in power machine 200 is but one example of an arrangement of these components. As discussed above, power machine 200 is a skid-steer loader and thus tractive elements on each side of the power machine are controlled together via the output of a single hydraulic pump, either through a single drive motor as in power machine 200 or with individual drive motors. Various other configurations and combinations of hydraulic drive pumps and motors can be employed as may be advantageous.

The power conversion system 224 of power machine 200 also includes a hydraulic implement pump 224C, which is also operably coupled to the power source 222. The hydraulic implement pump 224C is operably coupled to work actuator circuit 238C. Work actuator circuit 238 includes lift cylinders 238 and tilt cylinders 235 as well as control logic (such as one or more valves) to control actuation thereof. The control logic selectively allows, in response to operator inputs, for actuation of the lift cylinders and/or tilt cylinders. In some machines, the work actuator circuit also includes control logic to selectively provide a pressurized hydraulic fluid to an attached implement.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as skid-steer loader 200, unless otherwise noted or recited, the concepts discussed below are not intended to be limited in their application to the environments specifically described above.

Figure 5:
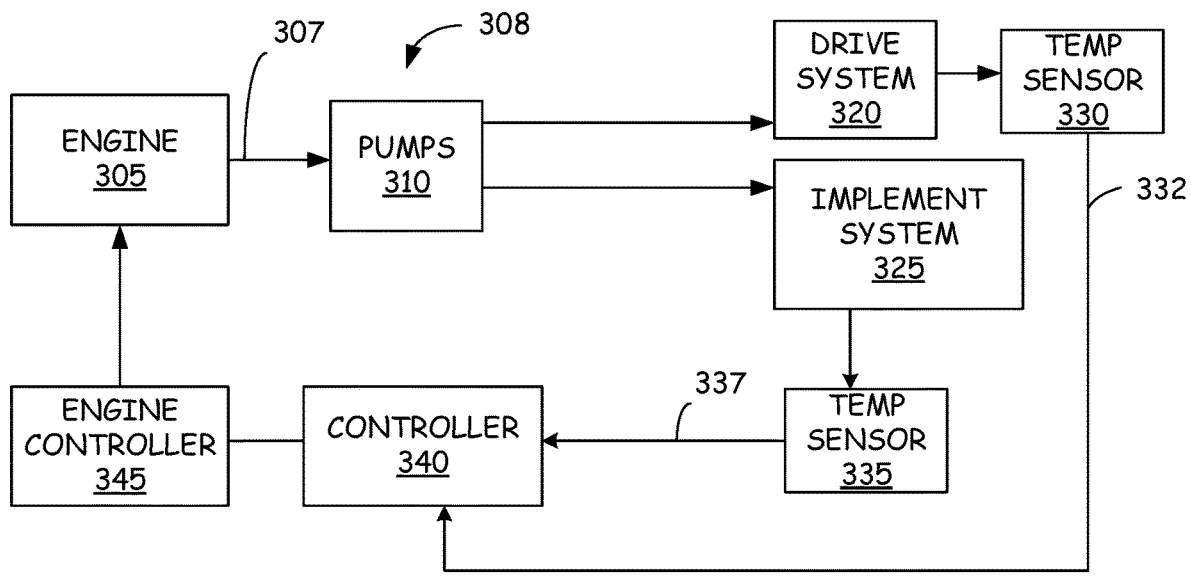
FIG. 5 is a block diagram of component systems of a hydraulic system for a power machine including a hydraulic oil temperature control.

Referring now to FIG. 5, shown is a block diagram of some components of a power machine 300, such as power machines 100 and 200 discussed above. FIG. 5 illustrates an engine 305 of the power machine 300 that drives a power conversion system 308 that includes one or more hydraulic pumps 310, for example using a rotational output shaft or member 307 of the engine. Engine 305 is an internal combustion engine, but in other embodiments, other types of engines or power sources may be employed. The one or more hydraulic pumps 310 provide pressurized hydraulic fluid or oil to components (e.g., drive motors, etc.) of a drive system 320 and components (e.g., lift arm actuators and auxiliary functions) of an implement system 325. In some embodiments, such as the skid-steer loader 200, hydraulic pumps 310 can include one or more drive pumps that are hydrostatically coupled to drive motors and an implement pump, which is provided to control work actuators, including, lift and tilt cylinders and implements that may be coupled to the power machine.

A first temperature sensor 330 measures the temperature of the hydraulic oil in the drive system, for example at an exit or entry of a drive motor and provides a temperature signal 332 to a machine controller 340. Hydrostatic motors of the type used in power machines such as skid-steer loaders usually have two bidirectional ports, one being inlet and the other an outlet when the drive motors are turning in one direction with the reverse being true when the drive motor is turning in the opposite direction. In addition, these motors have a case drain return port, which allows a not insignificant amount of pressurized hydraulic fluid to return to tank whenever the motor is being actuated. In some embodiments, the first temperature sensor is positioned to measure the temperature of oil returning to tank via the case drain return line. In some embodiments, power machines can have two or more drive motors. In such embodiments the case drain return line from each of two or more drive motors can be combined and the first temperature sensor can measure the combined return flow, which will effectively provide an average or nearly an average of the temperature being returned from each of the drive motors.

A second temperature sensor 335 is located in a different location within the hydraulic system to measure an effect that the implement system has on the temperature of hydraulic oil. In one embodiment, the second temperature sensor 335 is located at the case drain of the drive pump. Since the hottest temperature within the drive circuit (on a hydrostatic circuit) is known from the reading from the first temperature sensor, a reading taken at the second temperature sensor can provide an indication of the additive effect to the temperature of the hydraulic oil from the implement circuit. The second temperature sensor provides a temperature signal 337 to the machine controller 340.

By receiving the measured temperatures of the hydraulic oil, machine controller 340 can detect high temperatures, for example above a threshold temperature, and in high temperature situations, signal to an engine controller 345 to reduce the overall torque available from the engine. The engine controller 345 can then control the engine to reduce the overall torque of the engine in accordance with signals provided to the engine controller by the machine controller 340. For the purposes of this discussion, the engine controller 345 is differentiated from the machine controller 340 to describe the engine controller's specific functionality as opposed to controlling other functions on the machine. Machine controller 340 and engine controller 345 can be integrated into a single physical package, into two separate packages, or any number of packages (i.e., the machine controller 340 can be a collection of multiple controllers). This, in turn, reduces the overall heat generation in the hydraulic system. In some embodiments, machine controller 340 can be configured to utilize multiple temperature thresholds and to allow different engine torques for oil temperatures in different ranges. For example, as the oil temperature rises beyond individual thresholds, engine torque can be further reduced.

While a single temperature sensor can be used to measure oil temperature in the hydraulic system and machine controller 340 can manage engine torque based upon the measured oil temperature from one sensor, embodiments that utilize at least two temperature sensors in two different locations within the hydraulic system to allow machine controller 340 to determine which system is causing the high temperature condition. Temperatures in various locations within the system can vary depending on load case, i.e., depending upon whether the loading is occurring in the drive system 320 or the implement system 325. In addition, multiple oil temperature sensors can provide a more accurate picture of the overall load on the hydraulic system and can allow the machine controller to determine more precisely when to reduce torque on the engine and when not to. Therefore, with identification of the source of the high oil temperature, machine controller 340 is configured, in some embodiments to allow higher temperature operation without torque reduction or with less torque reduction when the drive system is the primary driver of higher oil temperatures. In other embodiments, the machine controller 340 is configured to allow higher temperature operation without torque reduction or with less torque reduction when the implement system is the primary driver of higher oil temperatures. In still other embodiments, the machine controller 340, can recognize certain use cases in the machine and manage the torque of the engine (i.e. allow it to continue without torque reduction or reduce torque of the engine) based on the use case. Machine controller 340 is also configured in some embodiments to shut down the power machine to prevent component damage when the temperature exceeds a threshold.

Figure 6:
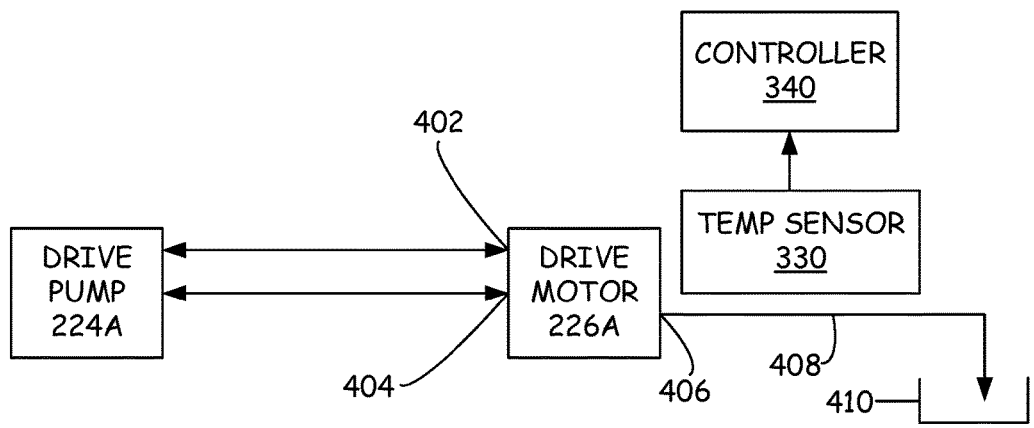
FIG. 6 is a block diagram of the portions of the hydraulic system shown in FIG. 5, showing components of the drive system in greater detail in accordance with one illustrative embodiment.

Referring now to FIG. 6, shown are some portions of the hydraulic system of FIG. 5, illustrating components of the drive system in greater detail in accordance with one exemplary embodiment. As shown, the at least one pump 310 includes a first drive pump 224A, and the drive system 320 includes a first drive motor 226A having an inlet 402 and an outlet 404. In some exemplary embodiments, the first temperature sensor 335 is positioned to measure temperature of hydraulic oil at one of the inlet 402 and the outlet 404 of the first drive motor 226A. As shown in FIG. 6, the first drive motor has a case drain outlet 406 with a return line 408 provided from the case drain to a hydraulic reservoir 410. In some exemplary embodiments, the first temperature sensor 330 is positioned to measure temperature of hydraulic oil in the return line 408 between the case drain outlet of the first drive motor and the hydraulic reservoir.

Figure 7:
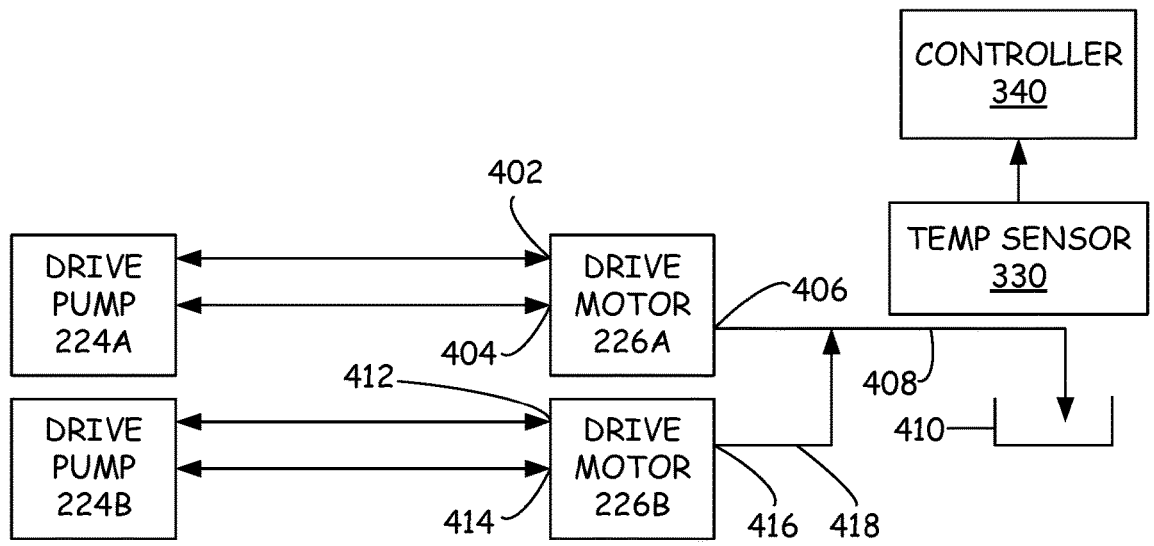
FIG. 7 is a block diagram of the portions of the hydraulic system shown in FIG. 5, showing components of the drive system in greater detail in accordance with another illustrative embodiment.

Referring now to FIG. 7, shown are portions of the hydraulic systems of FIGS. 5 and 6, with additional components illustrated in accordance with another exemplary embodiment. As shown, the drive system includes a second drive motor 426B with an inlet 412, an outlet 414, and a case drain outlet 416. A return line 418 from the case drain outlet of the second drive motor is in communication with the return line 408 from the case drain outlet of the first drive motor. The return lines from the two case drains are merged together. In one exemplary embodiment, the first temperature sensor (330) is positioned to measure temperature in the merged return lines.

Figure 8:
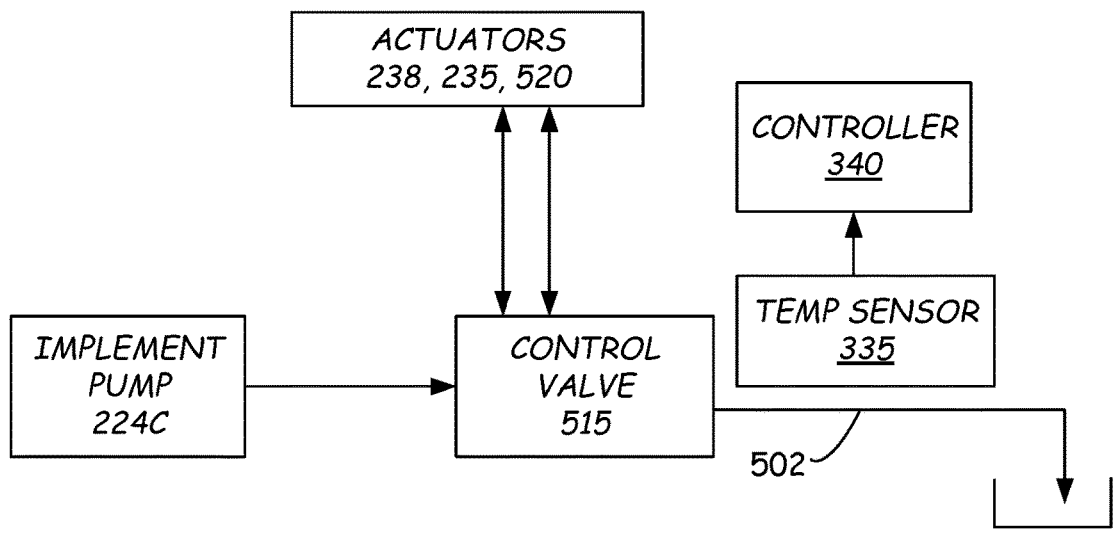
FIG. 8 is a block diagram of a portion of the hydraulic system of FIG. 5, showing additional detail of the implement system according to one illustrative embodiment.

Referring now to FIG. 8, shown are portions of the hydraulic system of FIG. 5, with additional components of the implement system illustrated according to one exemplary embodiment. As shown in FIG. 8, the at least one hydraulic pump can include an implement pump 224C, and the implement system 325 can include a control valve 515 configured to receive hydraulic oil from the implement pump 224C of the power conversion system and to selectively provide hydraulic flow to a lift actuator 238, a tilt actuator 235 and/or one or more auxiliary actuators 520 on an attached implement. The second temperature sensor 335 can be, in one exemplary embodiment, positioned to measure temperature of hydraulic oil at a case drain 502 of the at least one hydraulic pump, in this example, the case drain of implement pump 224C.

Although the present invention has been described with reference to preferred embodiments, workers skilled in the art will recognize that changes may be made in form and detail without departing from the spirit and scope of the invention.

What is claimed is:

1. A power machine comprising:
    an engine configured to provide a variable output torque;
    a hydraulic system, powered by the engine and including:
        a power conversion system providing pressurized hydraulic oil at one or more outlets, the power conversion system including a first hydrostatic pump coupled to and driven by the engine to provide the pressurized hydraulic oil and an implement pump coupled to and driven by the engine to provide the pressurized hydraulic oil;
        a drive system coupled to and configured to receive the pressurized hydraulic oil from the first hydrostatic pump of the power conversion system, the drive system and first hydrostatic pump comprising a first hydraulic circuit;
        an implement system coupled to and configured to receive the pressurized hydraulic oil from the implement pump of the power conversion system, the implement system and implement pump comprising a second hydraulic circuit separate from the first hydraulic circuit;
        a first temperature sensor positioned and configured to measure a first temperature of hydraulic oil in the drive system of the first hydraulic circuit and to provide a first temperature signal indicative of the measured first temperature of the hydraulic oil in the drive system; and
        a second temperature sensor positioned and configured to measure a second temperature of the hydraulic oil from the implement system and to provide a second temperature signal indicative of the measured second temperature and an effect that the implement system from the second hydraulic circuit has on temperature of the hydraulic oil; and
    a machine controller coupled to the first and second temperature sensors to receive the first temperature signal and the second temperature signal, the machine controller configured to control the variable output torque of the engine based upon the first and second temperature signals to allow different engine torques for temperatures of the hydraulic oil in different ranges depending upon which of the drive system and implement system has higher oil temperatures.

2. The power machine of claim 1, and further comprising an engine controller coupled to the machine controller and to the engine, the machine controller configured to provide a signal to the engine controller to control the variable output torque of the engine.

3. The power machine of claim 1, wherein the drive system includes a first drive motor.

4. The power machine of claim 3, wherein the first temperature sensor is positioned to measure temperature of the hydraulic oil at one of an inlet and an outlet of the first drive motor.

5. The power machine of claim 3, wherein the first drive motor has a case drain outlet with a return line provided from the case drain to a hydraulic reservoir, and wherein the first temperature sensor is positioned to measure the first temperature of the hydraulic oil in the return line between the case drain outlet of the first drive motor and the hydraulic reservoir.

6. The power machine of claim 5, wherein the drive system includes a second drive motor with a case drain outlet, wherein a return line from the case drain outlet of the second drive motor is in communication with the return line from the case drain outlet of the first drive motor, and wherein the return lines from the two case drain outlets are merged together and wherein the first temperature sensor is positioned to measure temperature in the merged return lines.

7. The power machine of claim 1, wherein the second temperature sensor is positioned to measure the second temperature of the hydraulic oil at a case drain.

8. The power machine of claim 1, and further comprising a frame and a lift arm assembly pivotally coupled to the frame, the implement system further comprising at least one lift actuator coupled between the lift arm assembly and the frame and configured to receive the pressurized hydraulic oil from the implement pump of the power conversion system to raise and lower the lift arm assembly.

9. The power machine of claim 8, wherein the implement system includes a control valve configured to receive the pressurized hydraulic oil from the implement pump of the power conversion system and selectively provide hydraulic flow to the lift actuator.

10. The power machine of claim 9, wherein the implement system further comprises an implement carrier pivotally coupled to the lift arm assembly, the implement system further comprising at least one implement carrier actuator coupled between the lift arm assembly and the implement carrier and configured to receive the hydraulic oil, selectively pressurized, from the implement pump of the power conversion system through the control valve to rotate the implement carrier relative to the lift arm assembly.

11. The power machine of claim 10, wherein the implement system further includes auxiliary function actuators.

12. The power machine of claim 1, wherein the machine controller is configured to reduce the variable output torque of the engine when one of the first and second temperature sensors indicates a temperature that exceeds one of multiple predetermined threshold temperatures to reduce heat generation in the hydraulic system.

13. A control system for a power machine having an engine configured to provide a variable output torque and a hydraulic system coupled to and driven by the engine to provide pressurized hydraulic oil at one or more outlets, the hydraulic system including a hydrostatic pump coupled to and driven by the engine to provide the pressurized hydraulic oil, a drive system coupled to the hydrostatic pump to form a first hydraulic circuit and configured to selectively receive the pressurized hydraulic oil to the hydrostatic pump to cause the power machine to move over a support surface, the hydraulic system also including an implement pump coupled to and driven by the engine to provide the pressurized hydraulic oil, and an implement system coupled to the implement pump to form a second hydraulic circuit, separate from the first hydraulic circuit, and configured to selectively receive the pressurized hydraulic oil from the implement pump to control one or more implement functions on the power machine, the control system comprising:
- a first temperature sensor positioned and configured to measure a first temperature of hydraulic oil in the drive system and to provide a first temperature signal indicative of the measured first temperature of the hydraulic oil in the drive system;
- a second temperature sensor positioned and configured to measure a second temperature of the hydraulic oil from the implement system and to provide a second temperature signal indicative of the measured second temperature and an effect that the implement system has on temperature of the hydraulic oil; and
- a machine controller coupled to the first and second temperature sensors to receive the first temperature signal and the second temperature signal, the machine controller configured to manage the variable output torque of the engine based upon the first and second temperature signals to allow different engine torques for temperatures of the hydraulic oil in different ranges depending upon which of the drive system and implement system has higher oil temperatures.

14. The control system of claim 13, wherein the machine controller is configured to manage the variable output torque of the engine to allow the different engine torques for the temperatures of the hydraulic oil in different ranges such that the machine controller allows higher output torque of the engine when the first temperature is higher than the second temperature indicating higher oil temperatures in the drive system as compared to the implement system, and the machine controller lowers output torque of the engine comparatively further when the second temperature is higher than the first temperature indicating higher oil temperatures in the implement system as compared to the drive system.

15. The control system of claim 14, wherein the machine controller is configured to reduce the variable output torque of the engine when one of the first and second temperatures exceeds one of multiple predetermined threshold temperatures to reduce heat generation in hydraulic system.

16. The control system of claim 15, wherein the machine controller is configured to reduce output torque of the engine further as one of the first and second temperatures exceeds higher ones of the multiple predetermined threshold temperatures.

17. The control system of claim 16, wherein the machine controller is configured to manage the variable output torque of the engine by signaling to an engine controller to control the variable output torque of the engine.

18. A power machine comprising:
an engine configured to provide a variable output torque;
a hydraulic system, powered by the engine and including:
- a power conversion system including a first hydraulic pump coupled to and driven by the engine to provide pressurized hydraulic oil at one or more outlets;
- a drive system coupled to and configured to receive the pressurized hydraulic oil from the power conversion system;
- an implement system coupled to and configured to receive the pressurized hydraulic oil from the power conversion system;
- a first temperature sensor positioned and configured to measure a first temperature of hydraulic oil in the drive system and to provide a first temperature signal indicative of the measured first temperature of the hydraulic oil in the drive system; and
- a second temperature sensor positioned and configured to measure a second temperature of the hydraulic oil and to provide a second temperature signal indicative of the measured second temperature and an effect that the implement system has on the hydraulic oil; and
a machine controller coupled to the first and second temperature sensors to receive the first temperature signal and the second temperature signal, the machine controller configured to control the variable output torque of the engine based upon the first and second temperature signals to allow different engine torques for temperatures of the hydraulic oil in different ranges, wherein the machine controller is configured to reduce the variable output torque of the engine when one of the first and second temperature sensors indicates a temperature that exceeds one of multiple predetermined threshold temperatures to reduce heat generation in the hydraulic system, and wherein the machine controller is configured such that, upon one of the first and second temperature sensors indicating a temperature that exceeds one of the multiple threshold temperatures, the machine controller allows higher output torque of the engine when the first temperature is higher than the second temperature indicating higher oil temperatures in the drive system as compared to the implement system, and the machine controller lowers output torque of the engine further when the second temperature is higher than the first temperature indicating higher oil temperatures in the implement system as compared to the drive system.

19. A power machine comprising:
an engine configured to provide a variable output torque;
a hydraulic system, powered by the engine and including:
- a power conversion system including a first hydraulic pump coupled to and driven by the engine to provide pressurized hydraulic oil at one or more outlets;
- a drive system coupled to and configured to receive the pressurized hydraulic oil from the power conversion system;
- an implement system coupled to and configured to receive the pressurized hydraulic oil from the power conversion system;
- a first temperature sensor positioned and configured to measure a first temperature of hydraulic oil in the drive system and to provide a first temperature signal indicative of the measured first temperature of the hydraulic oil in the drive system; and
- a second temperature sensor positioned and configured to measure a second temperature of the hydraulic oil and to provide a second temperature signal indicative of the measured second temperature and an effect that the implement system has on the hydraulic oil; and a machine controller coupled to the first and second temperature sensors to receive the first temperature signal and the second temperature signal, the machine controller configured to control the variable output torque of the engine based upon the first and second temperature signals to allow different engine torques for temperatures of the hydraulic oil in different ranges, wherein the machine controller is configured to reduce the variable output torque of the engine when one of the first and second temperature sensors indicates a temperature that exceeds one of multiple predetermined threshold temperatures to reduce heat generation in the hydraulic system, and wherein the machine controller is configured such that, upon one of the first and second temperature sensors indicating a temperature that exceeds one of the multiple threshold temperatures, the machine controller allows higher output torque of the engine when the second temperature is higher than the first temperature indicating higher oil temperatures in the implement system as compared to the drive system, and the machine controller lowers output torque of the engine further when the first temperature is higher than the second temperature indicating higher oil temperatures in the drive system as compared to the implement system.

* * * * *